May 3, 1927.
G. EGLOFF ET AL
1,627,164
APPARATUS FOR TREATING OILS
Original Filed June 8, 1921
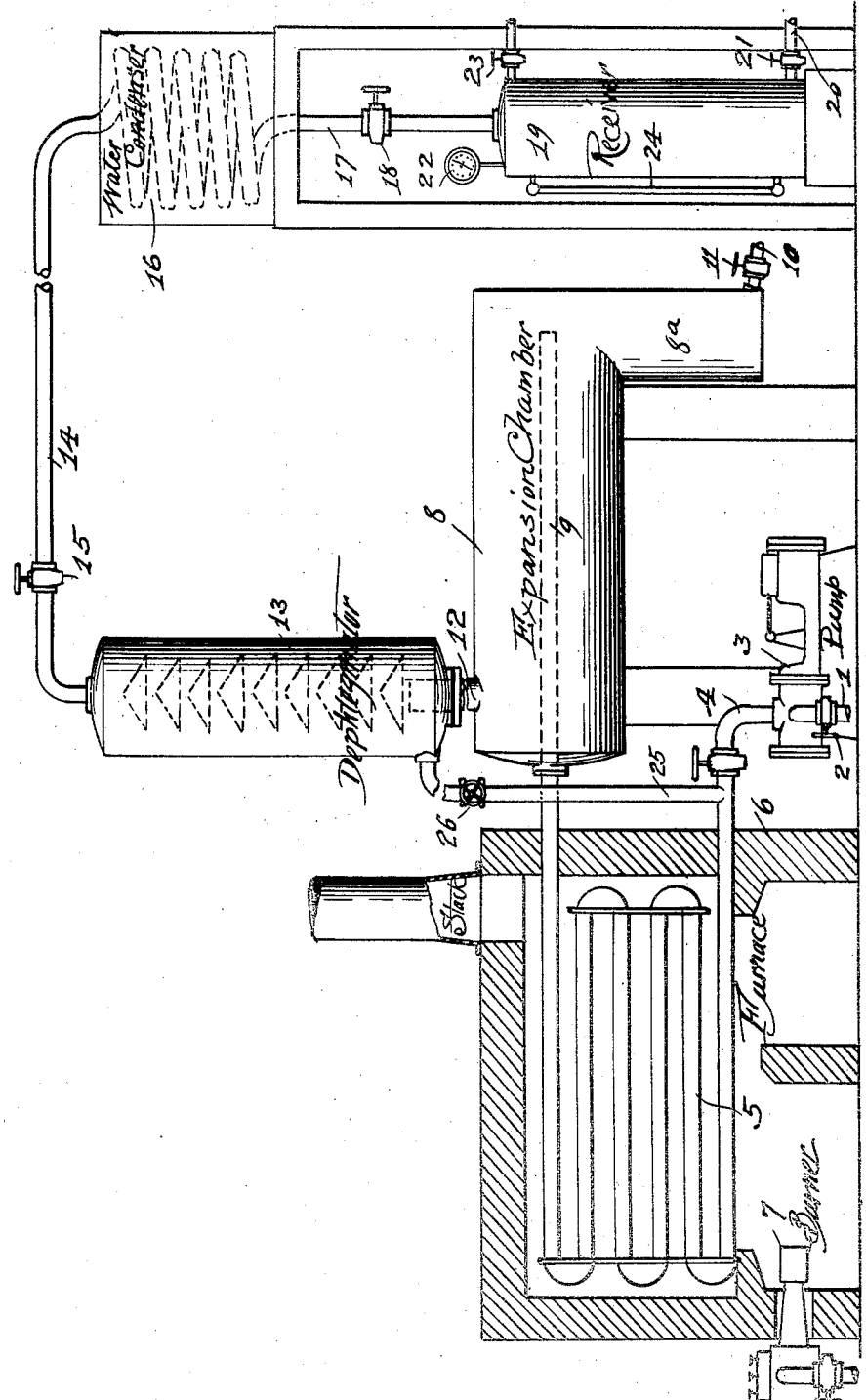
Witness,
S.D. Mann
Inventors,
Gustav Egloff.
William R. Howard.
By Frank L. Belknap Atty Patented May 3, 1927.

1,627,164

UNITED STATES PATENT OFFICE.

GUSTAV EGLOFF, OF CHICAGO, ILLINOIS, AND WILLIAM R. HOWARD, OF WASHINGTON, DISTRICT OF COLUMBIA, ASSIGNORS TO UNIVERSAL OIL PRODUCTS COMPANY, OF CHICAGO, ILLINOIS, A CORPORATION OF SOUTH DAKOTA.

APPARATUS FOR TREATING OILS.

Application filed June 8, 1921, Serial No. 475,862. Renewed February 5, 1927.

This invention relates to improvements in apparatus for treating oils and refers more particularly to an apparatus in which the carbon which is separated from the oil in the vaporization thereof is concentrated in the carbon pots situated in one end of the expansion or vaporizing chamber.

Among the salient objects of the invention are to provide an apparatus in which the oil is introduced to the expansion chamber in the opposite end from that at which the vapors are relieved therefrom, thereby permitting a longer period of time for the vaporizing reaction to take place and causing the more heated oil to permeate and work back through the cooler oil through the reacting period; to provide an apparatus in which the vaporizing chamber is shaped to form a carbon pot wherein the fine particles of separated carbon collect and are drawn off therefrom; to provide an apparatus which is more easily cleaned in that the carbon is concentrated in the relatively restricted portion of the vaporizing chamber.

The single figure is a diagrammatic side elevational view of the apparatus.

Referring in detail to the drawings, the oil to be treated is introduced through the inlet pipe 1 regulated by a valve 2 and is charged by means of a pump 3 through the line 4 to the heating tubes 5 which are mounted in a furnace 6 heated by means of gas burners 7. The oil after being raised to a cracking temperature, passes through the transfer line into the expansion chamber 8 which transfer line extends substantially the entire length of the expansion or vaporizing chamber as shown at 9. The oil which has been heated to a reacting temperature in the heating zone is thus introduced into the opposite end of the vaporizing chamber from that at which the transfer line enters. As the oil passes into the vaporizing zone, there is immediately a free carbon separation as is well known and this free carbon tends to settle and collect into the carbon leg 8ª of the vaporizing chamber. It is a well known fact in the cracking art that at a point where the transfer line discharges oil into the vaporizing chamber, there collects the greater portion of the free carbon which is deposited out of the oil in the vaporizing chamber. By introducing the oil as shown this carbon will tend to collect with the heaver residual substances in the carbon leg 8ª and may be drawn off continuously or intermittently as desired through the residuum line 10 controlled by a valve 11. The oil on being introduced to the cracking chamber releases the lighter vaporous fractions which collect in the upper part of the vapor chamber and are drawn off through the riser 12 which is connected to a dephlegmator 13. After being refluxed, the uncondensed portion passes over through the line 14 regulated by a valve 15 to a water condenser 16, the liquid distillate therefrom passing down through the line 17 regulated by a valve 18 to the receiver 19 where it may be drawn off through the liquid drawoff line 20 controlled by a valve 21. Pressure on the system is designated by pressure gauge 22; this pressure may be positively regulated by pressure relief valve 23. Liquid level gauge 24 designates at all times the height of the liquid in the receiver. The reflux from the dephlegmator may be returned in regulated quantities through the reflux line 25 controlled by a valve 26 to the charging line 4 where it is reintroduced to the heating zone for further treatment.

An additional feature of importance in the vaporization of the oil is the fact that the vapors which are released from the oil immediately on its being introduced to the vaporizing chamber, must pass over and in contact with a considerable oil body in the expansion zone in their travel to the riser 12 through which they pass off into the dephlegmator. By causing the vapors to pass substantially the entire length of the vapor chamber in this manner, the vapors are given ample time to separate out the undesirable fractions in the expansion chamber. These heavier and high boiling point oils pass down into the carbon leg and may be drawn off with the free carbon as residuum.

We claim as our invention:

1. In an oil distilling apparatus, an elongated horizontally disposed expansion chamber, a conduit for heated oil passing from one end of said chamber substantially through the same and discharging the oil at the opposite end thereof, said chamber having a vertical leg at the discharge end of said conduit, a vapor outlet positioned away from the discharge end of the conduit for discharging vapors from said chamber, a dephlegmator communicating with said outlet and a residuum discharge from said leg.

2. In an apparatus for treating hydrocarbon oils, the combination with means for heating oil, of an elongated horizontally disposed expansion chamber, a conduit conveying the oil through said expansion chamber to one end thereof, said expansion chamber having a vertically disposed leg at the discharge end of the conduit, a vapor outlet leading from the expansion chamber positioned away from the discharge end of said conduit, and a dephlegmator communicating with said outlet.

3. In an oil distilling apparatus, an elongated horizontally disposed reaction chamber, a closed means for passing heated oil from one end of said chamber substantially through the same, and discharging the oil into the chamber at the opposite end thereof, said chamber having a leg adjacent the discharge end of said closed oil carrying means, means for discharging vapors from the chamber positioned at a point remote from the discharge end of the closed oil carrying means, dephlegmating means communicating with said vapor discharge means and residuum drawoff means from said leg.

4. In an oil distilling apparatus, an enlarged reaction chamber, a closed means for conveying heated oil substantially completely through the same, said means permitting the discharge of the heated oil into the chamber at a point remote from that at which said closed means enters the reaction chamber, said chamber being provided with a downwardly extending enlarged portion adjacent the point of discharge of the oil from said closed means into said reaction chamber, a vapor outlet leading from the reaction chamber at a point remote from said enlarged portion and condensing means in communication with said vapor outlet.

GUSTAV EGLOFF.
WILLIAM R. HOWARD.